United States Patent
Nishida et al.

(10) Patent No.: US 9,592,580 B2
(45) Date of Patent: Mar. 14, 2017

(54) MACHINE TOOL

(71) Applicant: Yamazaki Mazak Corporation, Niwa-gun (JP)

(72) Inventors: Kiyoshi Nishida, Niwa-gun (JP); Takeshi Yasuda, Niwa-gun (JP); Kazuhiro Noda, Niwa-gun (JP); Makoto Tahara, Niwa-gun (JP)

(73) Assignee: YAMAZAKI MAZAK CORPORATION, Aichi (JP)

(*) Notice: Subject to any disclaimer, the term of this patent is extended or adjusted under 35 U.S.C. 154(b) by 0 days.

(21) Appl. No.: 14/810,398

(22) Filed: Jul. 27, 2015

(65) Prior Publication Data
US 2015/0336229 A1 Nov. 26, 2015

Related U.S. Application Data

(63) Continuation of application No. PCT/JP2014/063587, filed on May 22, 2014.

(51) Int. Cl.
*B23Q 11/08* (2006.01)
*B23Q 7/14* (2006.01)
(Continued)

(52) U.S. Cl.
CPC ......... *B23Q 7/1431* (2013.01); *B23Q 1/0045* (2013.01); *B23Q 5/345* (2013.01);
(Continued)

(58) Field of Classification Search
CPC ... Y10T 409/30532; Y10T 409/305432; Y10T 409/306048; Y10T 409/306104;
(Continued)

(56) References Cited

U.S. PATENT DOCUMENTS 4,705,187 A * 11/1987 Linn ................. B23Q 11/08
220/819
5,265,497 A * 11/1993 Curless .............. F16P 3/08
29/33 P
(Continued)

FOREIGN PATENT DOCUMENTS

CN 1275467 12/2000
DE 10020804 A1 * 11/2001
(Continued)

OTHER PUBLICATIONS

Machine translation of Decision to Grant a Patent in Japanese Patent Application No. 2014-541457, which decision was drafted on Oct. 29, 2014.*
(Continued)

*Primary Examiner* — Erica E Cadugan
(74) *Attorney, Agent, or Firm* — Mori & Ward, LLP

(57) ABSTRACT

A machine tool includes a main machine, a pallet change unit, a main body cover, a machine entry door, an internal machine cover, and an internal entrance area. The main machine is configured to machine a workpiece. The pallet change unit is adjacent to the main machine. The main body cover is provided on the pallet change unit. The machine entry door is provided in the main body cover. The internal machine cover is connected to the machine entry door. The internal entrance area is defined by the machine entry door and the internal machine cover. The machine entry door and the internal machine cover are constructed to sweep the internal entrance area.

20 Claims, 16 Drawing Sheets

(51) Int. Cl.
*B23Q 7/02* (2006.01)
*B23Q 1/00* (2006.01)
*B23Q 5/34* (2006.01)

(52) U.S. Cl.
CPC ............ *B23Q 7/02* (2013.01); *B23Q 11/0891* (2013.01); *Y10S 29/056* (2013.01); *Y10S 29/086* (2013.01); *Y10T 29/5196* (2015.01); *Y10T 409/30392* (2015.01)

(58) Field of Classification Search
CPC ............ Y10T 29/5196; Y10T 29/5124; Y10T 483/16; Y10T 483/165; Y10T 409/30392; Y10S 29/053; Y10S 29/056; Y10S 29/06; Y10S 29/086; B23Q 1/66; B23Q 7/1431; B23Q 7/00–7/18; B23Q 11/08–11/0891
USPC ........ 409/159, 161, 172, 173, 134; 29/33 P, 29/563, DIG. 53, DIG. 56, DIG. 60, 29/DIG. 86; 198/345.3, 346.1; 483/14–15
See application file for complete search history.

(56) References Cited

U.S. PATENT DOCUMENTS

| | | | |
|---|---|---|---|
| 6,364,582 B1 | 4/2002 | Hoppe et al. | |
| 2002/0033082 A1 | 3/2002 | Nakaminami et al. | |
| 2002/0104935 A1* | 8/2002 | Schweizer | B23Q 1/0045 409/134 |
| 2012/0137884 A1 | 6/2012 | Steinman | |
| 2012/0255833 A1 | 10/2012 | Ryu | |
| 2015/0016914 A1 | 1/2015 | Nishida et al. | |
| 2015/0367472 A1 | 12/2015 | Suzuki et al. | |

FOREIGN PATENT DOCUMENTS

| | | | |
|---|---|---|---|
| JP | 06-042044 U | | 6/1994 |
| JP | 11-114767 A | * | 4/1999 |
| JP | 2000-045664 | | 2/2000 |
| JP | 2000-317766 | | 11/2000 |
| JP | 2002-096239 | | 4/2002 |
| JP | 2006-021262 A | * | 1/2006 |
| JP | 2007-190623 A | * | 8/2007 |
| JP | 5497972 B1 | | 5/2014 |
| KR | 10-1235542 B1 | * | 2/2013 |
| WO | WO 2014/002173 | | 1/2014 |

OTHER PUBLICATIONS

Machine Translation of JP 2007-190623 A, which JP '623 was published.*
Chinese Office Action for corresponding CN Application No. 201480002379.8, Aug. 15, 2016.
The decision to grant a patent for corresponding JP Application No. 2014-541457, Nov. 4, 2014.
Chinese Office Action for corresponding CN Application No. 201480002379.8, Oct. 14, 2016 (w/ English machine translation).

* cited by examiner

A-A

B-B

MACHINE TOOL

CROSS-REFERENCE TO RELATED APPLICATIONS

The present application is a continuation application of International Application No. PCT/JP2014/063587, filed May 22, 2014. The contents of this application are incorporated herein by reference in their entirety.

BACKGROUND OF THE INVENTION

Field of the Invention

The present invention relates to a machine tool.

Discussion of the Background

FIGS. 16 and 17 illustrate a conventional mechanism. A machine tool 1 includes a pallet change unit 20 on the front side of a main machine 10. The main machine 10 includes a table 12. The pallet change unit 20 includes a pallet change base 21, a pallet change slider 22, and a pallet turning arm 23. The pallet change slider 22 reciprocates on the pallet change base, and the pallet turning arm 23 makes turning. By these movements, pallets 24 are replaceably supplied to the table 12. A main body cover 26 covers the pallet change unit 20. On a side surface of the main body cover 26, a sliding door 30 is disposed. The sliding door 30 is openable and closable in arrow K directions. In the case where an operator enters a work area $E_2$, the operator pulls out a plug switch 62 inserted in the switch panel 60 after the pallet turning arm 23 is turned from an operating position to an evacuating position illustrated in FIG. 17 with the pallet change slider 22 stationary at a setup position F. As a result, the power source to the pallet change unit 20 is shut off, and a door lock switch, not illustrated, between the sliding door 30 and a cover 15 of the main machine is unlocked. Next, the operator opens the sliding door 30 to enter an internal passage area $E_1$, and opens an operator door 50 of the main machine to move into the work area $E_2$. With the plug switch 62 pulled out, an interlocking mechanism is in operation to keep the power source of the pallet change unit 20 off even if the sliding door 30 is closed. The operator carries the plug switch 62 when entering the internal passage area $E_1$ or the work area $E_2$. This ensures that the power source of the pallet change unit 20 will not be turned on even if another operator attempts to turn on the power source while the former operator stays in the internal passage area $E_1$ or the work area $E_2$. In this manner, safety of the operator is ensured.

Japanese Unexamined Utility Model Application Publication No. 06-042044 and Japanese Unexamined Patent Application Publication No. 2000-045664 are incorporated herein by reference in their entirety.

SUMMARY OF THE INVENTION

According to one aspect of the present invention, a machine tool includes a main machine, a pallet change unit, a main body cover, a machine entry door, an internal machine cover, and an internal entrance area. The main machine is configured to machine a workpiece. The pallet change unit is adjacent to the main machine. The main body cover is provided on the pallet change unit. The machine entry door is provided in the main body cover. The internal machine cover is connected to the machine entry door. The internal entrance area is defined by the machine entry door and the internal machine cover. The machine entry door and the internal machine cover are constructed to sweep the internal entrance area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
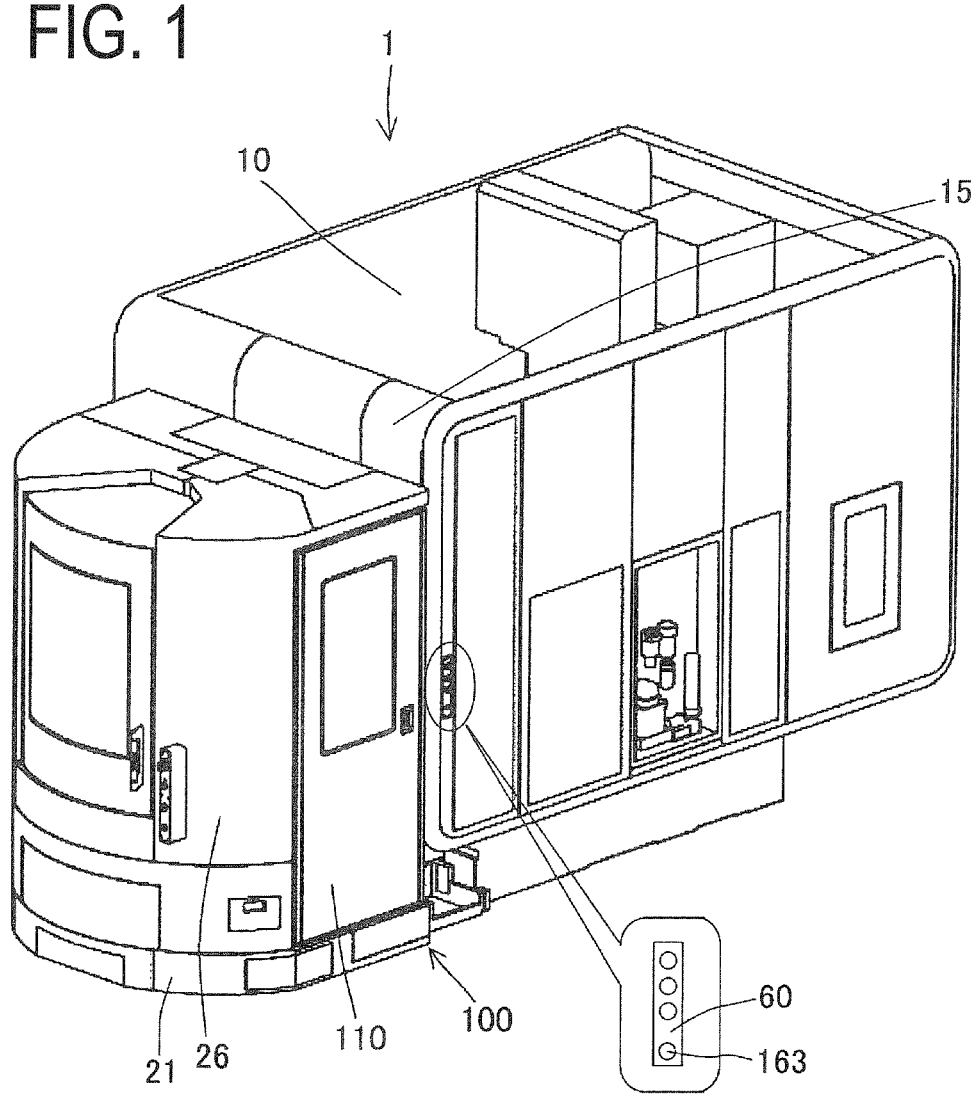
FIG. 1 is a perspective view of a machine tool according to an embodiment of the present invention provided with an access door device.

The embodiments will now be described with reference to the accompanying drawings, wherein like reference numerals designate corresponding or identical elements throughout the various drawings.

Figure 2:
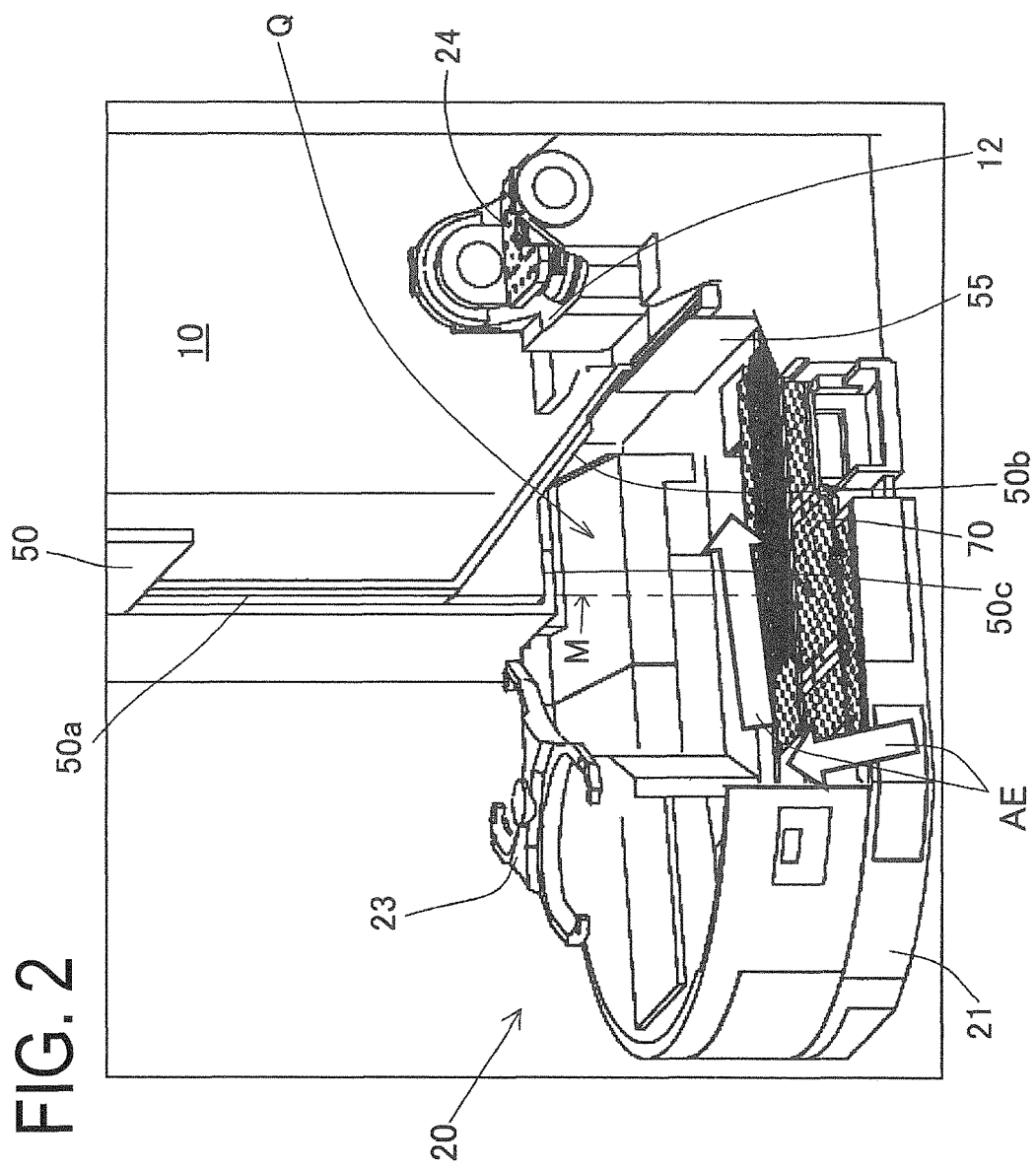
FIG. 2 is a perspective view of main components or elements of the machine tool according to the embodiment of the present invention provided with the access door device.
Figure 3:
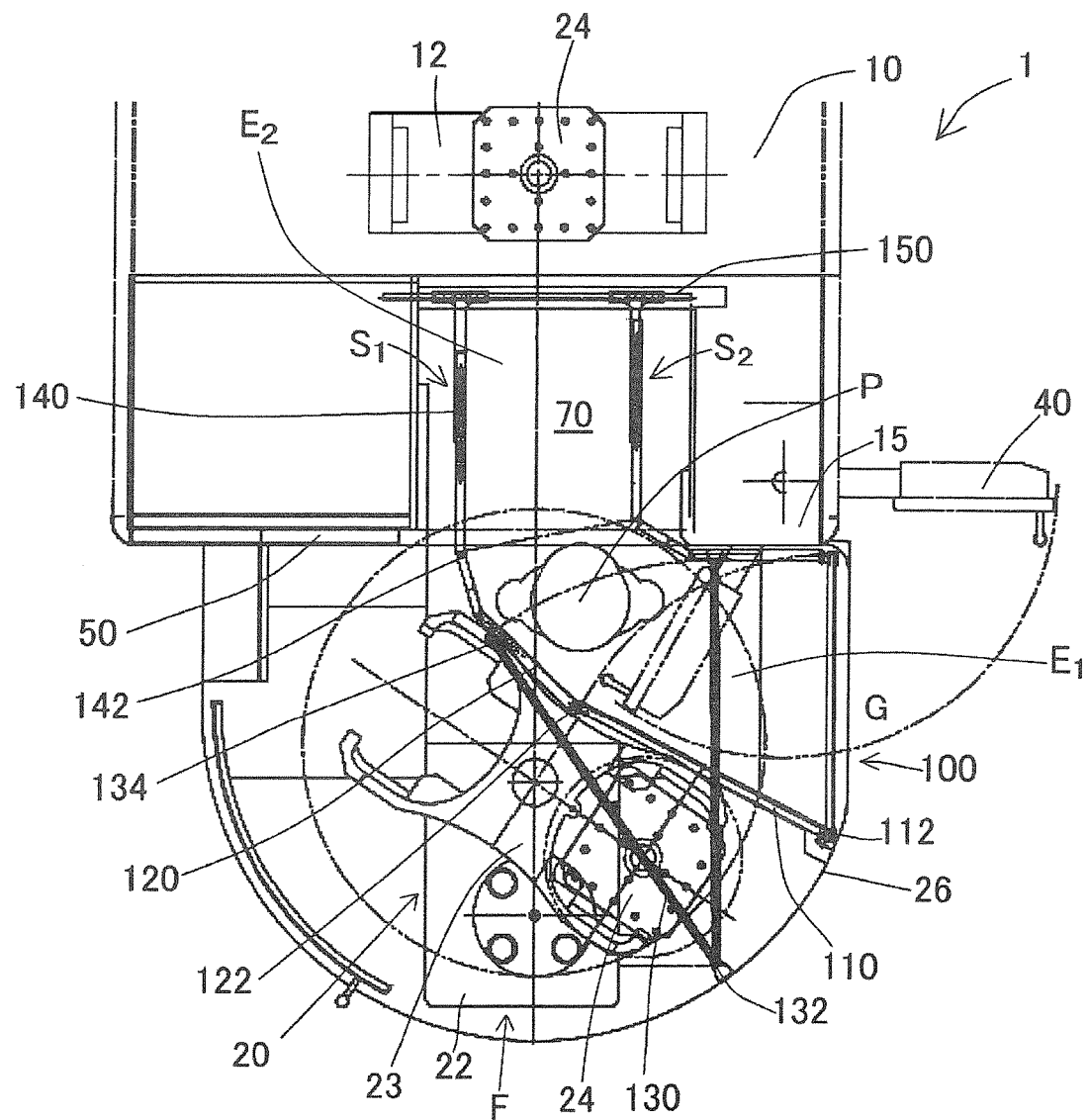
FIG. 3 is a plan view of the main components or elements of the machine tool according to the embodiment of the present invention provided with the access door device.

FIG. 1 is a perspective view of a machine tool 1 according to the embodiment of the present invention provided with an access door device 100. FIG. 2 is a perspective view of main components or elements of the machine tool 1. FIG. 3 is a plan view of the main components or elements.

The machine tool 1 includes a pallet change unit 20 on the front side of a main machine 10, similarly to the conventional machine tool. The main machine 10 includes a table 12. The pallet change unit 20 includes a pallet change base 21, a pallet change slider 22, and a pallet turning arm 23. Referring to FIG. 2, the arrows AE indicate an entry passage for an operator.

The access door device 100 includes a machine entry door 110 and a first internal machine cover 120. The machine entry door 110 is mounted on a main body cover 26 of the pallet change unit 20 through a hinge 112, which is a link mechanism. The first internal machine cover 120 is mounted on the open edge of the machine entry door 110 through a hinge 122, which is a link mechanism. On the open edge of the first internal machine cover 120, a second internal machine cover 140 is mounted through a hinge 142, which is a link mechanism. The second internal machine cover 140 is guided by a linear guide 150 and a reciprocating-movement control mechanism 155. The movement of the first internal machine cover 120 is restrained by a link member 130.

Figure 4:
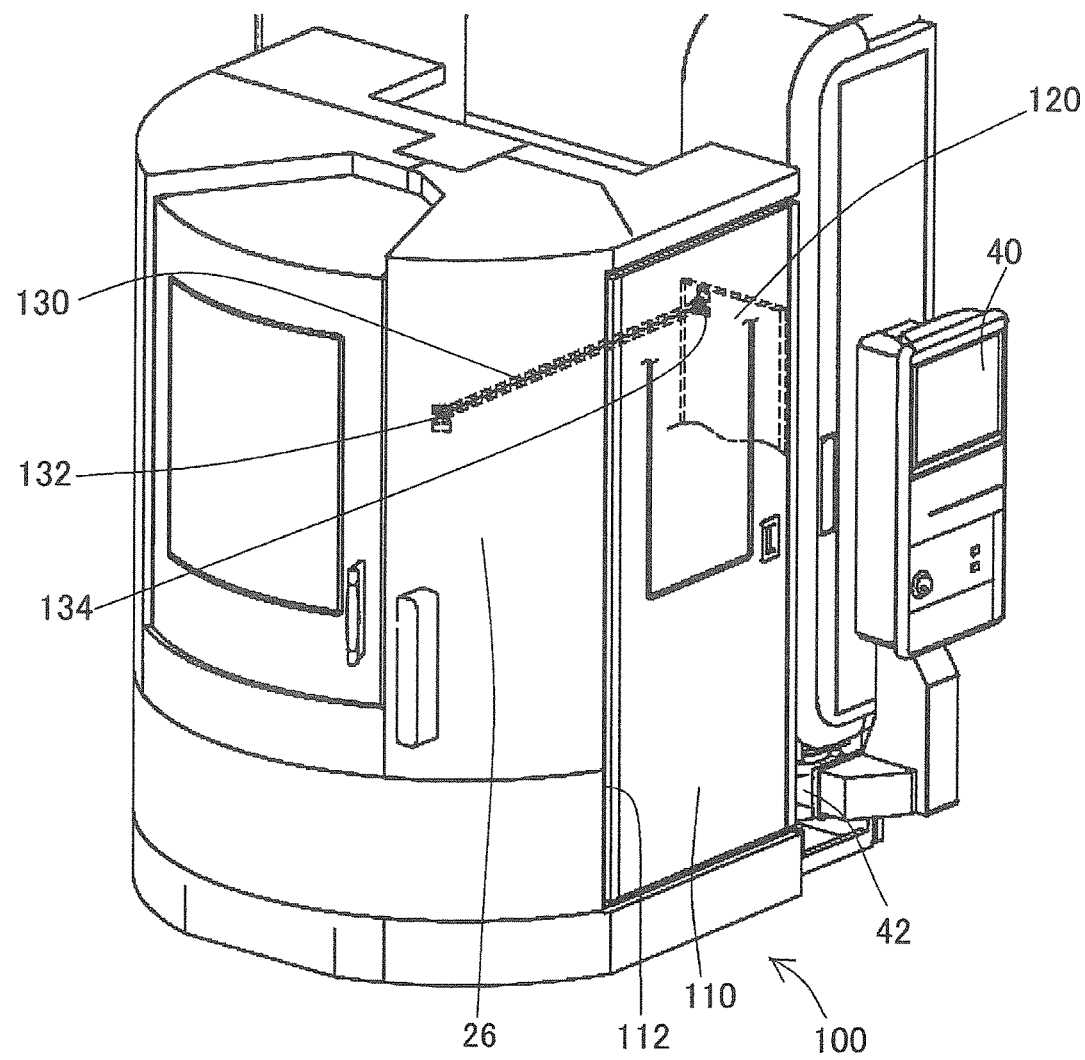
FIG. 4 is a perspective view of the main components or elements of the machine tool according to the embodiment of the present invention provided with the access door device.
Figure 5:
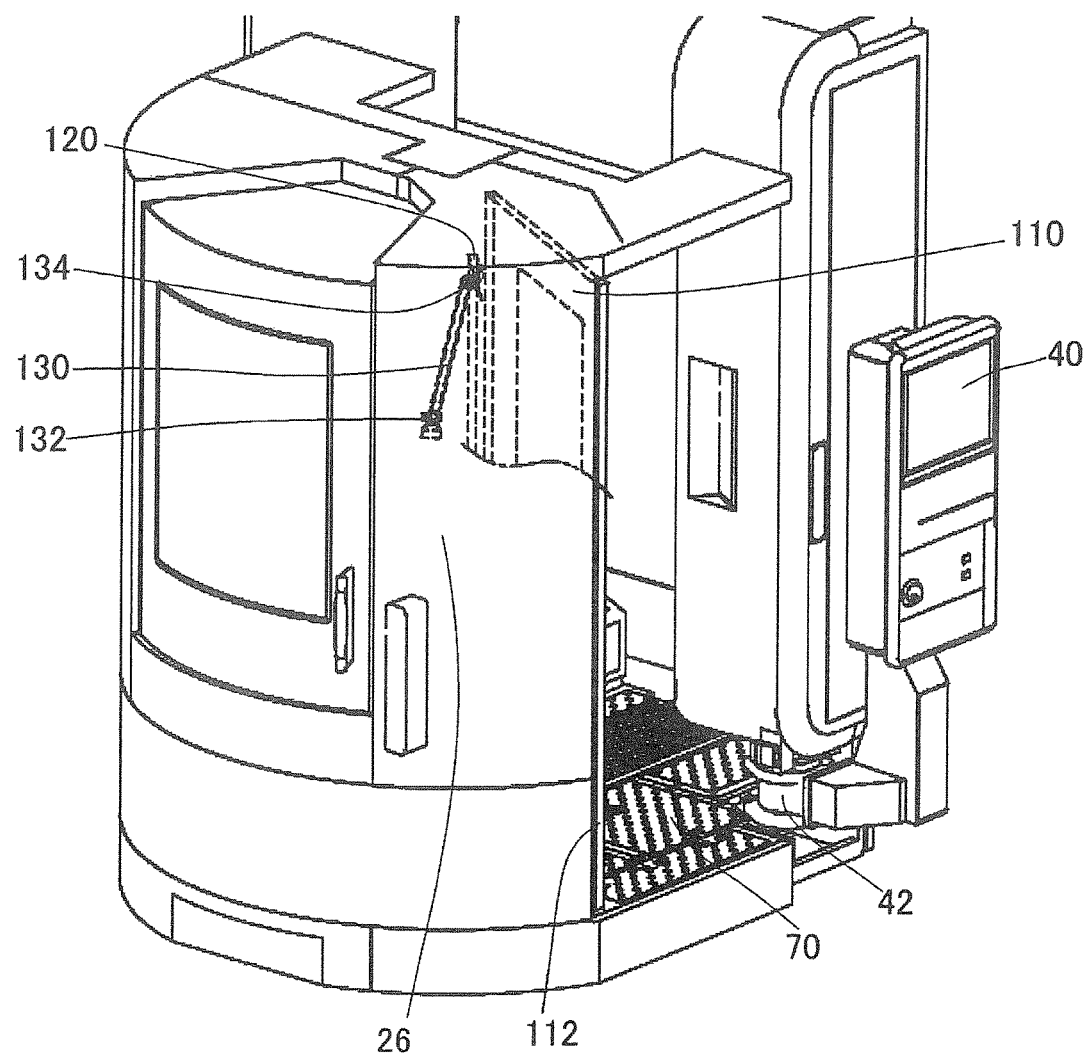
FIG. 5 is a perspective view of the main components or elements of the machine tool according to the embodiment of the present invention provided with the access door device.

FIG. 4 illustrates the machine entry door 110 of the access door device 100 in closed state. FIG. 5 illustrates the machine entry door 110 in open state. When the machine entry door 110 is opened, the link member 130 guides the first internal machine cover 120 on a predetermined track while turning the first internal machine cover 120 about a hinge 132. Thus, the link member 130 functions as first internal-machine-cover restraining means.

An operation panel 40 is disposed on the opposite side of the hinge 112 across the machine entry door 110. The operation panel 40 is mounted on a turning mechanism 42, which is provided in the main machine 10. The turning mechanism 42 is turnable about a predetermined turning axis to change the position of the operation panel 40.

As illustrated in FIG. 3, the pallet change unit 20 includes two areas forming an internal operator entrance area, namely, an internal passage area $E_1$ and a work area $E_2$. The internal passage area $E_1$ is defined by the machine entry door 110 and the first internal machine cover. The work area $E_2$ is on the front side of the table and communicates with the internal passage area $E_1$. The internal passage area $E_1$ and the work area $E_2$ are partitioned from each other by an operator door 50, which is opened and closed by the operator. The operator, P, opens the machine entry door 110 at a position G to enter the internal passage area $E_1$. Then, the operator P opens the operator door 50 to move into the work area $E_2$. In the work area $E_2$, the operator P performs work on the table 12 or the spindle. Here, the operator P swings the operation panel 40 into the internal passage area $E_1$ to control the machine from the internal passage area $E_1$ or the work area $E_2$.

Figure 6:
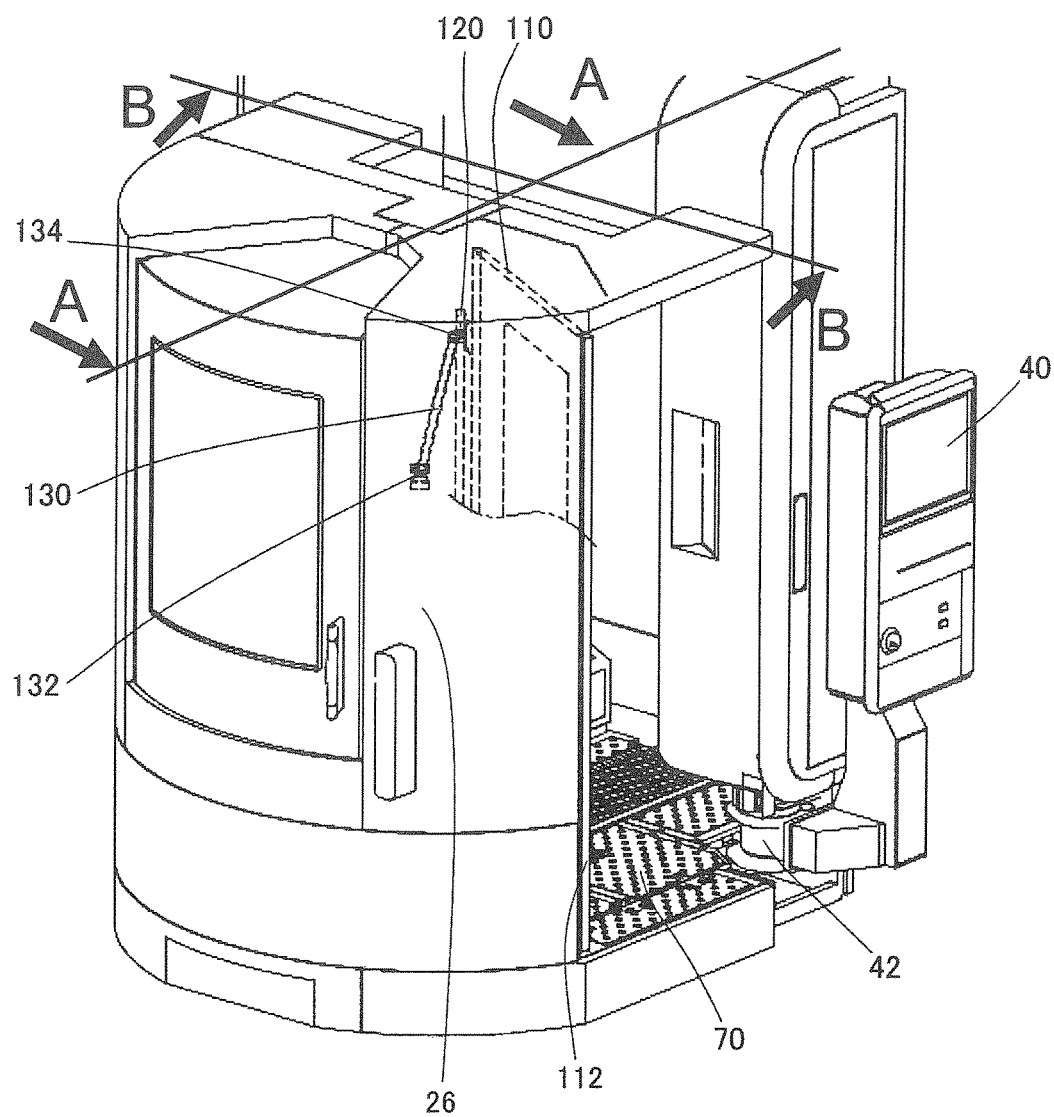
FIG. 6 is a perspective view of the main components or elements of the machine tool according to the embodiment of the present invention provided with the access door device.
Figure 7:
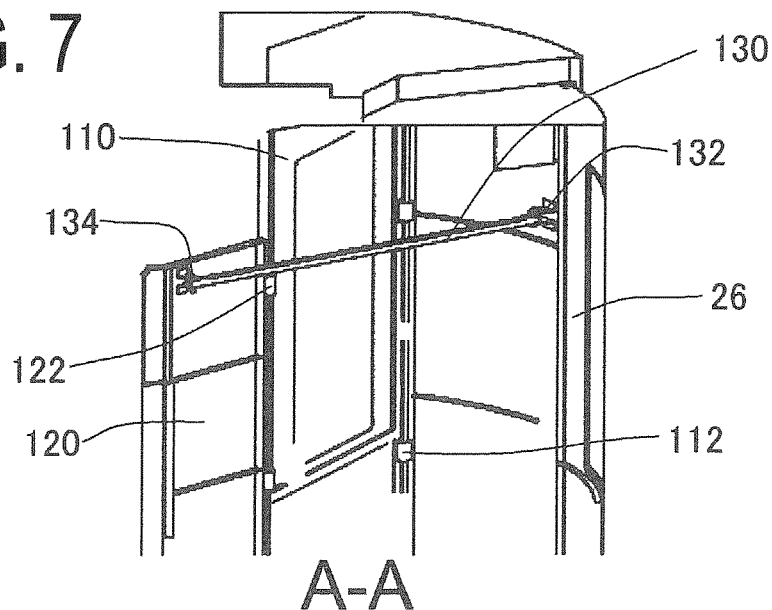
FIG. 7 is a view of the machine tool from the direction indicated by arrows A-A illustrated in FIG. 6.
Figure 8:
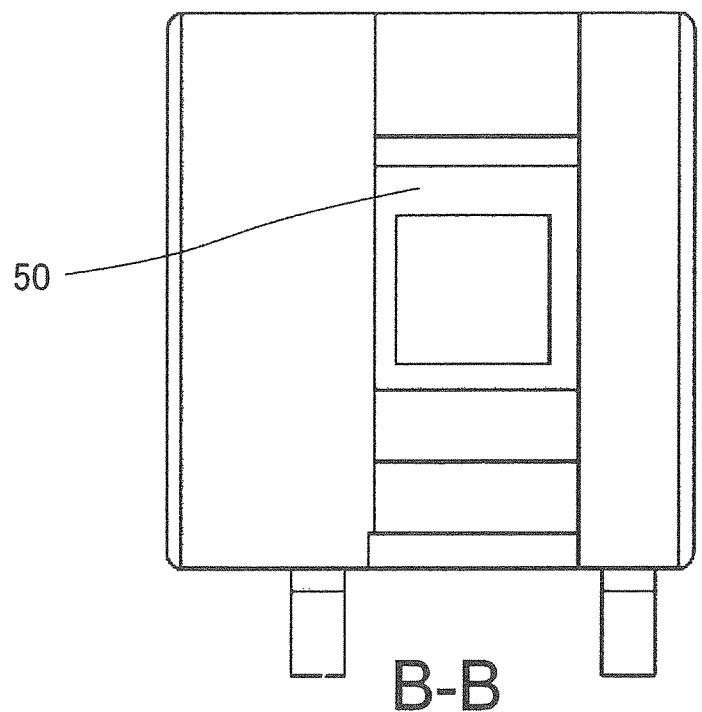
FIG. 8 is a view of the machine tool from the direction indicated by arrows B-B illustrated in FIG. 6.

FIG. 6 illustrates the machine entry door 110 in open state. FIG. 7 is a view of the machine entry door 110 from the direction indicated by the arrows A-A illustrated in FIG. 6. FIG. 8 is a view of the operator door 50 from the direction indicated by the arrows B-B.

In FIG. 7, the link member 130 has one end mounted on the main body cover 26 of the pallet change unit 20 through the hinge 132, and has another end mounted on the first internal machine cover 120 through a hinge 134.

FIG. 8 illustrates a specific example of the operator door 50. As described above, the operator door 50 partitions the internal passage area $E_1$ of the pallet change unit 20 and the work area $E_2$ from each other. The operator door 50 is a sliding door on the front surface of the main machine 10. While the main machine 10 of the machine tool 1 is machining a workpiece, the sliding door 50 is closed. This prevents byproducts and other substances resulting of the machining process from scattering toward the pallet turning arm 23.

Figure 9:
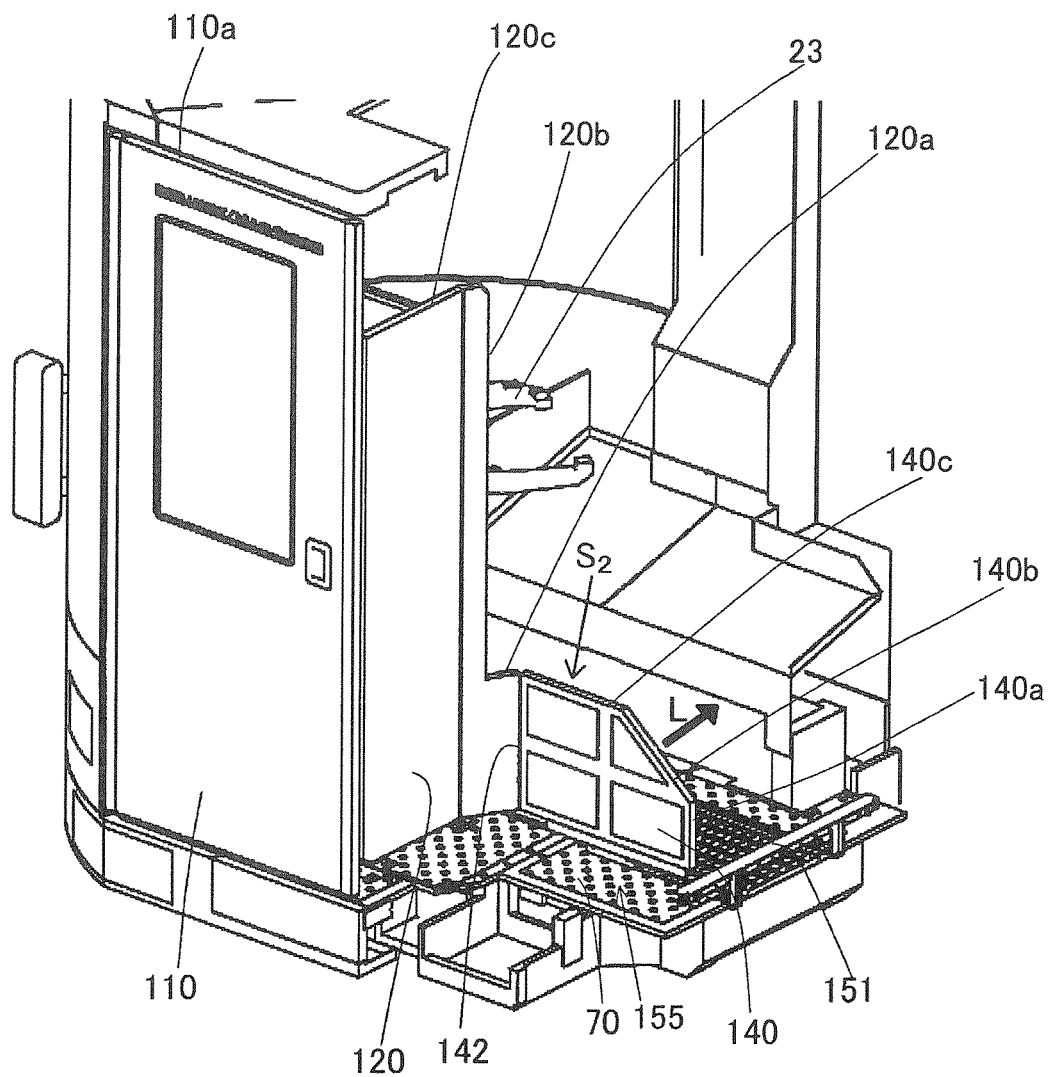
FIG. 9 is a perspective view of the main components or elements of the machine tool according to the embodiment of the present invention provided with the access door device.
Figure 10:
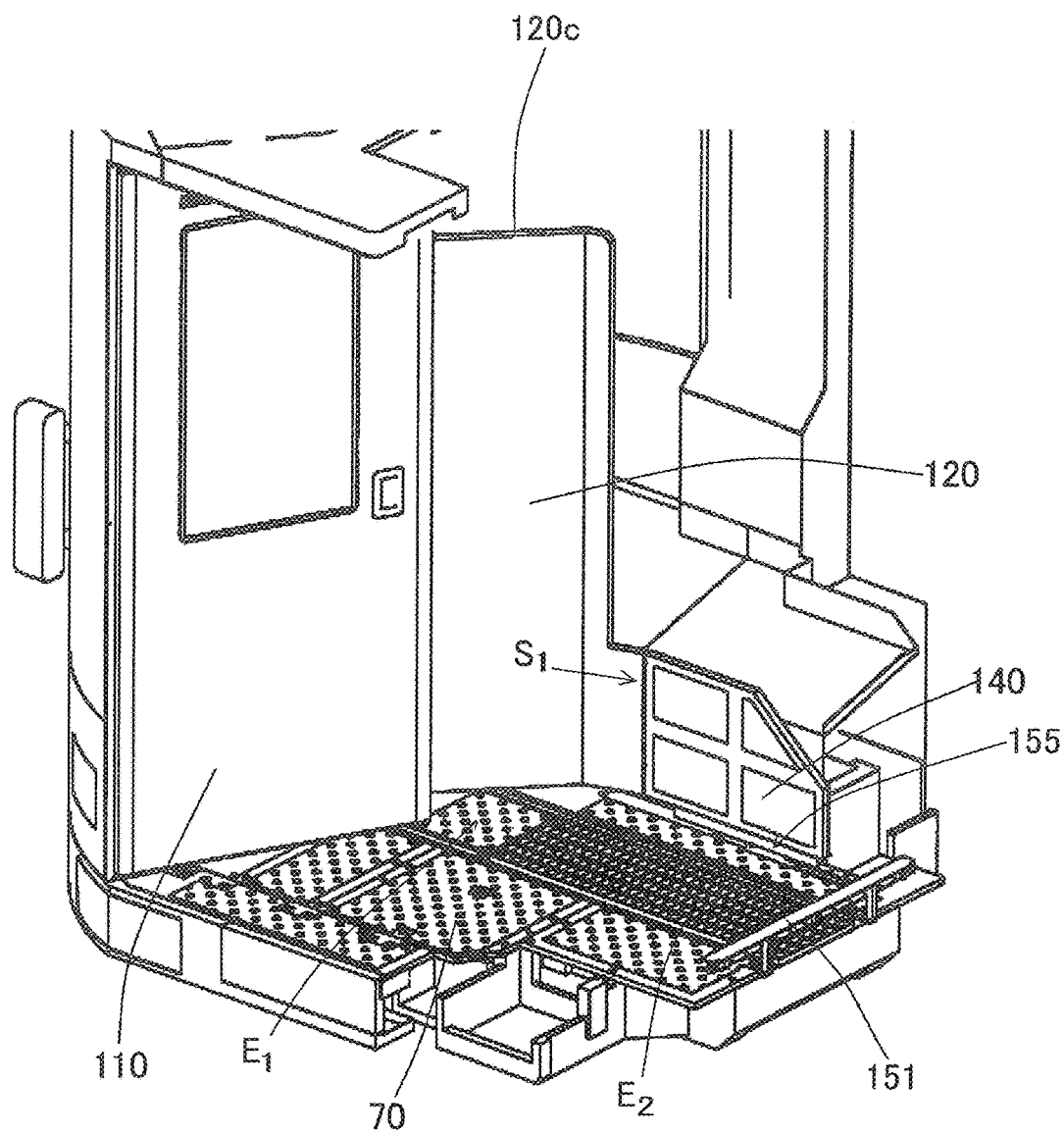
FIG. 10 is a perspective view of the main components or elements of the machine tool according to the embodiment of the present invention provided with the access door device.

FIGS. 9 and 10 illustrate how the machine entry door 110, the first internal machine cover 120, and the second internal machine cover 140 are connected to each other.

FIG. 9 illustrates the machine entry door 110 in closed state. FIG. 10 illustrates the machine entry door 110 in open state.

When the machine entry door 110 is opened from its closed position, the first internal machine cover 120 is also moved, since the first internal machine cover 120 is connected to the machine entry door 110. Then, the second internal machine cover 140, which is connected to the first internal machine cover 120, is moved from a position S2 in the arrow L direction. The second internal machine cover 140 is guided by the linear guide 150 and the reciprocating-movement control mechanism 155. When the machine entry door 110 is opened completely, the second internal machine cover 140 is moved to a position S1. Thus, the work area $E_2$ is secured.

Figure 11:
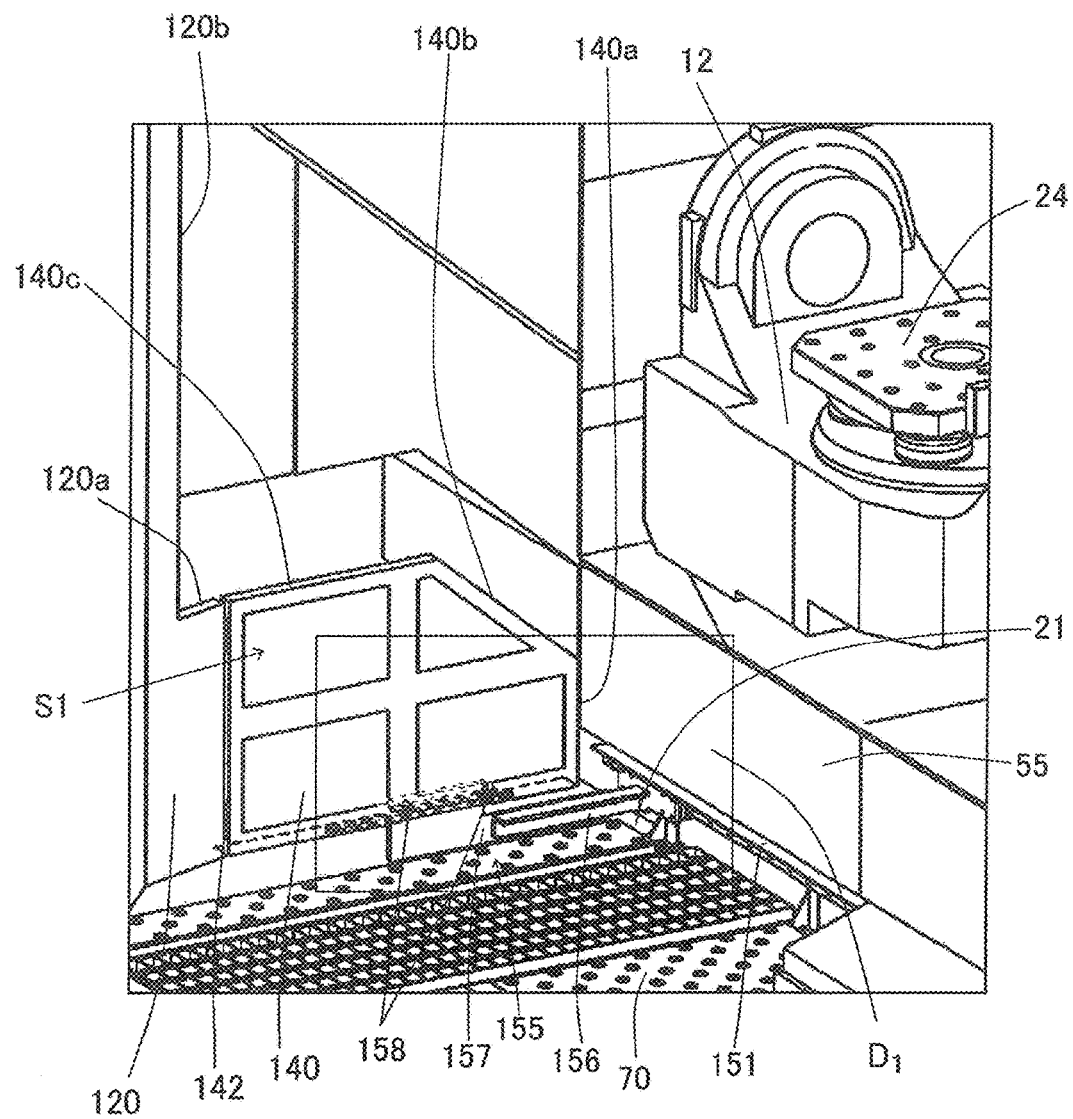
FIG. 11 is a perspective view of a reciprocating-movement control mechanism.
Figure 12:
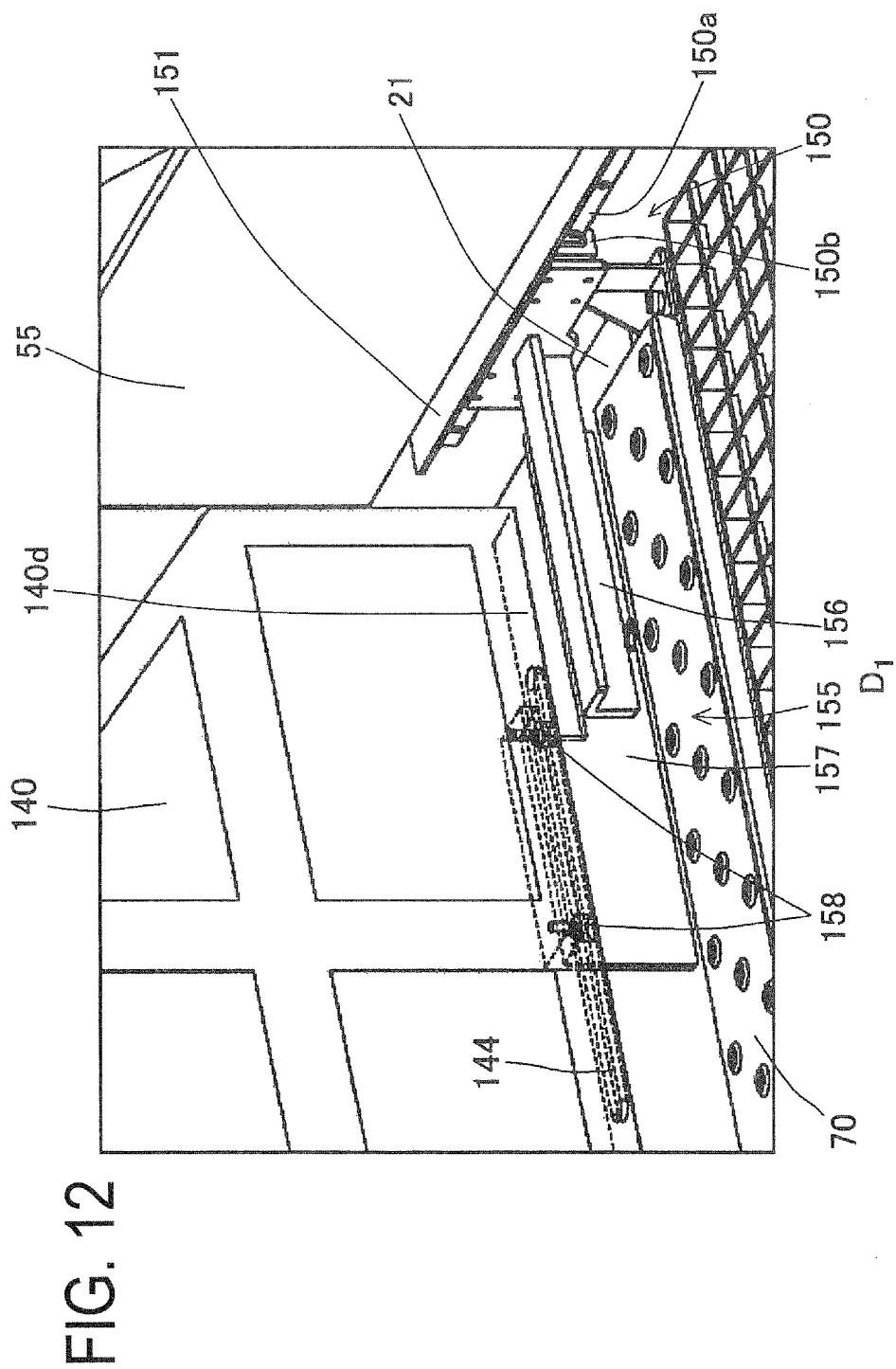
FIG. 12 is an enlarged perspective view of a part illustrated in FIG. 11.

FIG. 11 is a perspective view of a configuration of the vicinity of the reciprocating-movement control mechanism 155. FIG. 12 is an enlarged perspective view of a part $D_1$ illustrated in FIG. 11.

Under the front cover 55 of the machine tool 1, a linear-guide mounting bracket 151 is mounted on the pallet change base 21 in parallel to the front cover 55. On the linear-guide mounting bracket 151, a linear-guide rail 150a of the linear guide 150 is mounted. A linear-guide block 150b is fitted with the linear guide rail 150a and movable on the linear guide rail 150a. An arm 156 is mounted on the linear-guide block 150b. A bracket 157 is fixed to the arm 156. On the bracket 157, a plurality of cam followers 158 are aligned perpendicularly to the direction in which the linear-guide block 150b moves. The cam followers 158 are engaged with an elongate hole 144, which is disposed in the longitudinal direction of a lower surface 140d of the second internal machine cover 140. With the cam mechanism thus configured, when the first internal machine cover 120 moves on a predetermined track confined by the link member 130 while turning the first internal machine cover 120 about the hinge 132 by means of opening the machine entry door 110, the second internal machine cover 140 moves between the position S1 and the position S2 at approximately the same angle relative to the linear-guide rail 150a.

As illustrated in FIG. 2, a front surface 50a of the operator door 50 is overhung toward the pallet change unit 20 relative to the front cover 55. For this reason, the operator door 50 includes an inclined surface 50b and a protruding lower surface 50c. When the operator door 50 is closed, a space Q is formed below the front surface 50a of the operator door 50. The space Q is surrounded by the front cover 55 and a working floor 70.

As illustrated in FIG. 11, in order to avoid the operator being left in the space Q, a front surface 140a of the second internal machine cover 140 is designed to be movable adjacent to the front surface of the front cover 55 with a gap of, for example, 150 mm (millimeters) between the front surface 140a and the front surface of the front cover 55. It is noted that the gap of 150 mm should not be construed in a limiting sense. Any other size of gap is possible insofar as the operator will not be left in the space Q. Similarly, an inclined surface 140b of the second internal machine cover 140 is designed to be movable adjacent to the inclined surface 50b of the operator door 50 with a gap of, for example, 150 mm between the inclined surface 140b and the inclined surface 50b. Further, an upper surface 140c of the second internal machine cover 140 and a cut-portion upper surface 120a of the first internal machine cover 120 are designed to be movable adjacent to the protruding lower surface 50c of the operator door 50 with a gap of, for example, 150 mm between the upper surface 140c and the protruding lower surface 50c and between the cut-portion upper surface 120a and the protruding lower surface 50c. Additionally, a cut-portion side surface 120b of the first internal machine cover 120 is designed to be movable adjacent to the front surface 50a of the operator door 50 with a gap of, for example, 150 mm between the cut-portion side surface 120b and the front surface 50a. It is noted that the gaps of 150 mm should not be construed in a limiting sense. Any other sizes of gap are possible insofar as the operator will not be left in the space Q.

As illustrated in FIG. 10, the first internal machine cover 120 has a height greater than the height at which the pallet turning arm 23 of the pallet change unit 20 is disposed. Preferably, an upper surface 120c of the first internal machine cover 120 has such a height that while the operator stays in the internal passage area $E_1$, the body of the operator, including the hands and feet, will not come into contact with the pallet turning arm 23. For example, at a height of approximately 800 mm from the upper surface of the pallet turning arm 23 to the working floor 70, the height from the upper surface 120c of the first internal machine cover 120 to the working floor 70 is approximately 1600 mm. It is noted that the height at the upper surface 120c of the first internal machine cover 120 may the same as the height at an upper surface 110a of the machine entry door 110, and will not be limited to 1600 mm.

Figure 13:
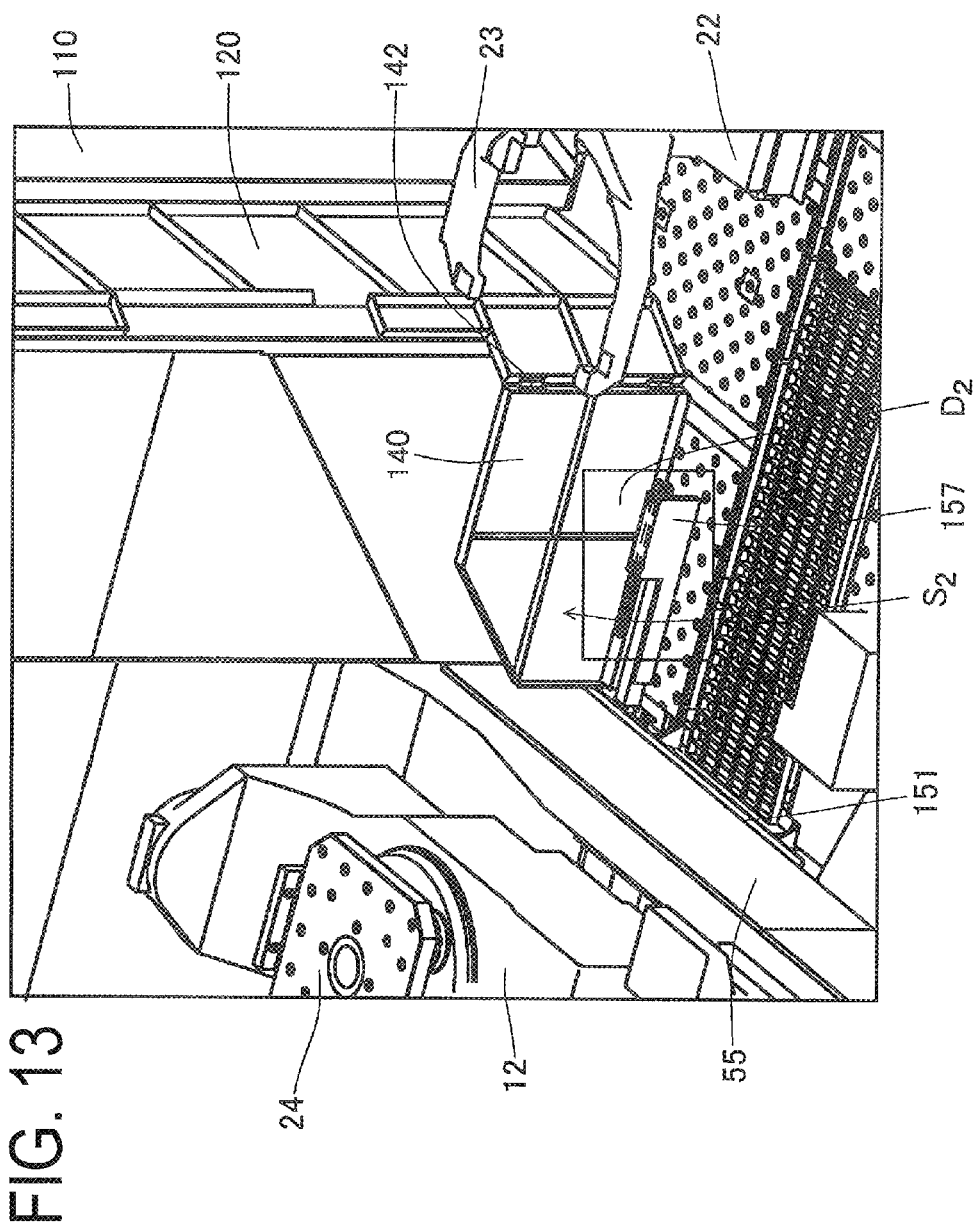
FIG. 13 is a partially enlarged perspective view of FIG. 9.
Figure 14:
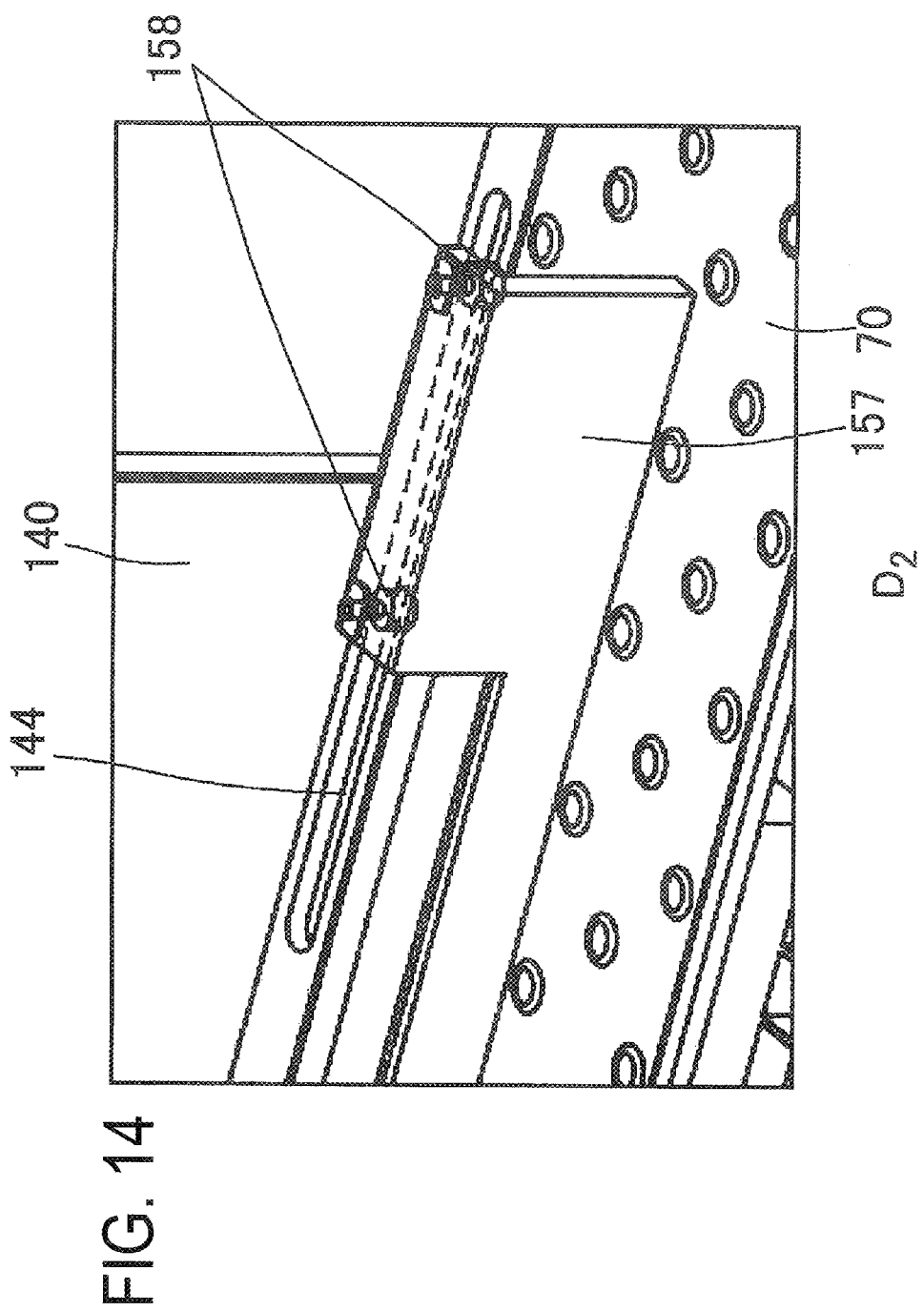
FIG. 14 is a partially enlarged perspective view of FIG. 13.

FIG. 13 is an enlarged perspective view of the second internal machine cover 140 back to the position S2 from the position S1 in conjunction with closing of the machine entry door 110. FIG. 14 is an enlarged perspective view of a part $D_2$ illustrated in FIG. 13.

In conjunction with closing of the machine entry door 110, the second internal machine cover 140 moves from the position S1 to the position S2, making no space for the operator in the work area $E_2$. As the second internal machine cover 140 moves from the position S1 to the position S2, the work area $E_2$ is gradually diminished. This requires the operator to go out to the position G through the internal passage area $E_1$. This, as a result, prevents the operator from being left in the internal passage area $E_1$ nor in the work area $E_2$. Even if another operator erroneously attempts to close the machine entry door 110 while the former operator stays in the work area $E_2$, the second internal machine cover 140 interferes with the operator to prevent the machine entry door 110 from being closed. Thus, as a result, safety of the operator is ensured.

Figure 15:
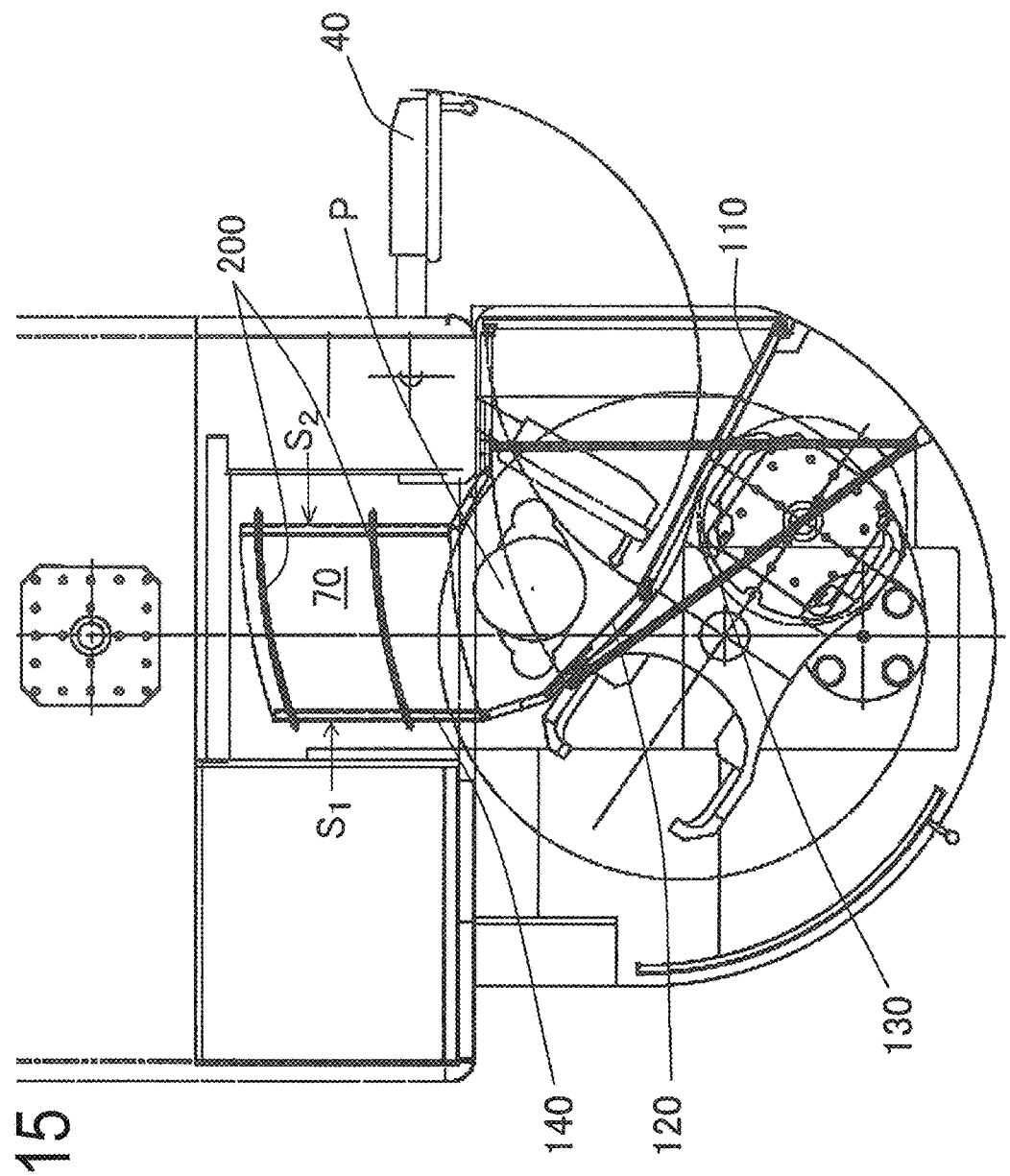
FIG. 15 is a plan view of the machine tool according to the embodiment of the present invention provided with another access door device.
Figure 16:
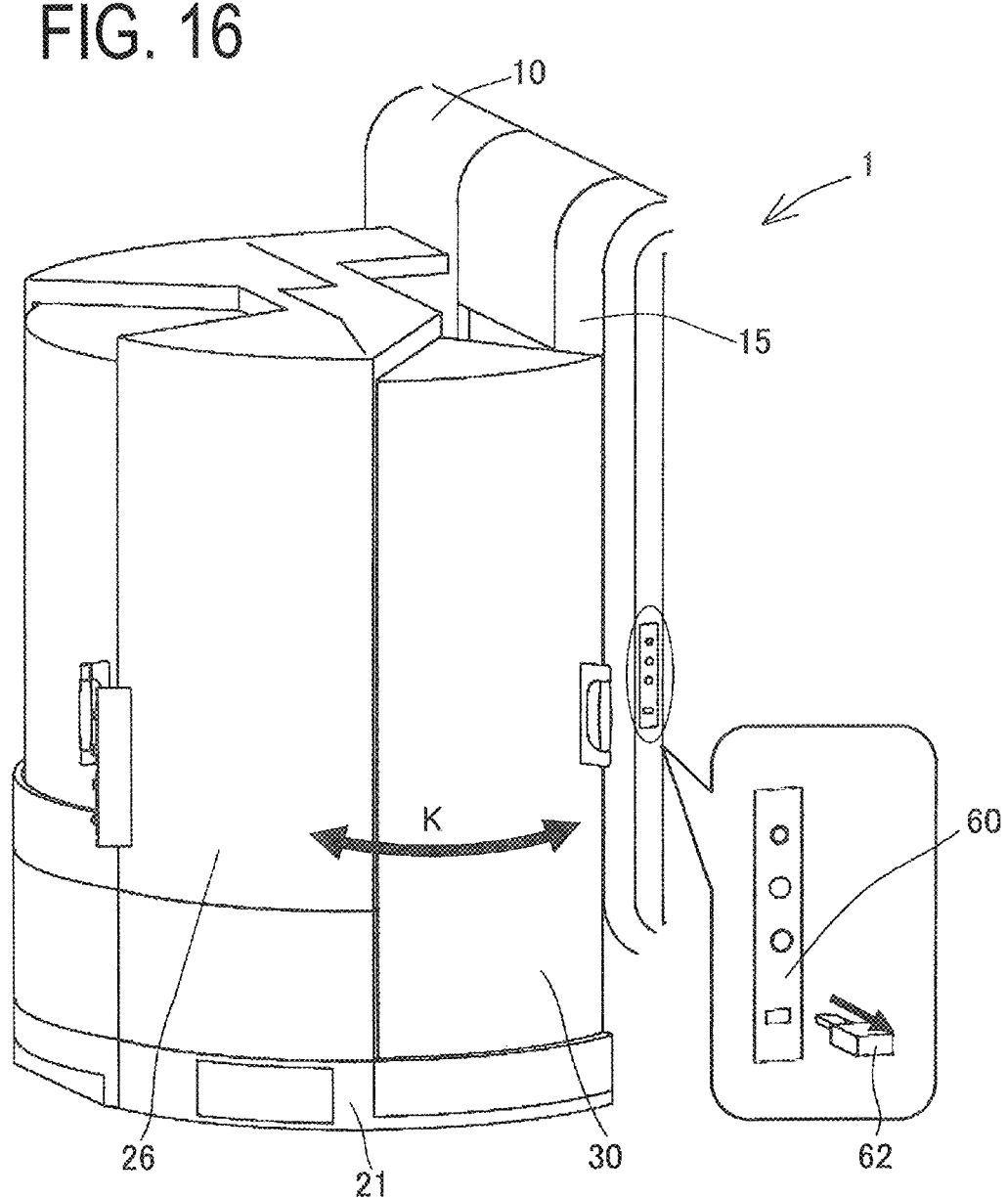
FIG. 16 is a perspective view of machine tool provided with a conventional access door device.
Figure 17:
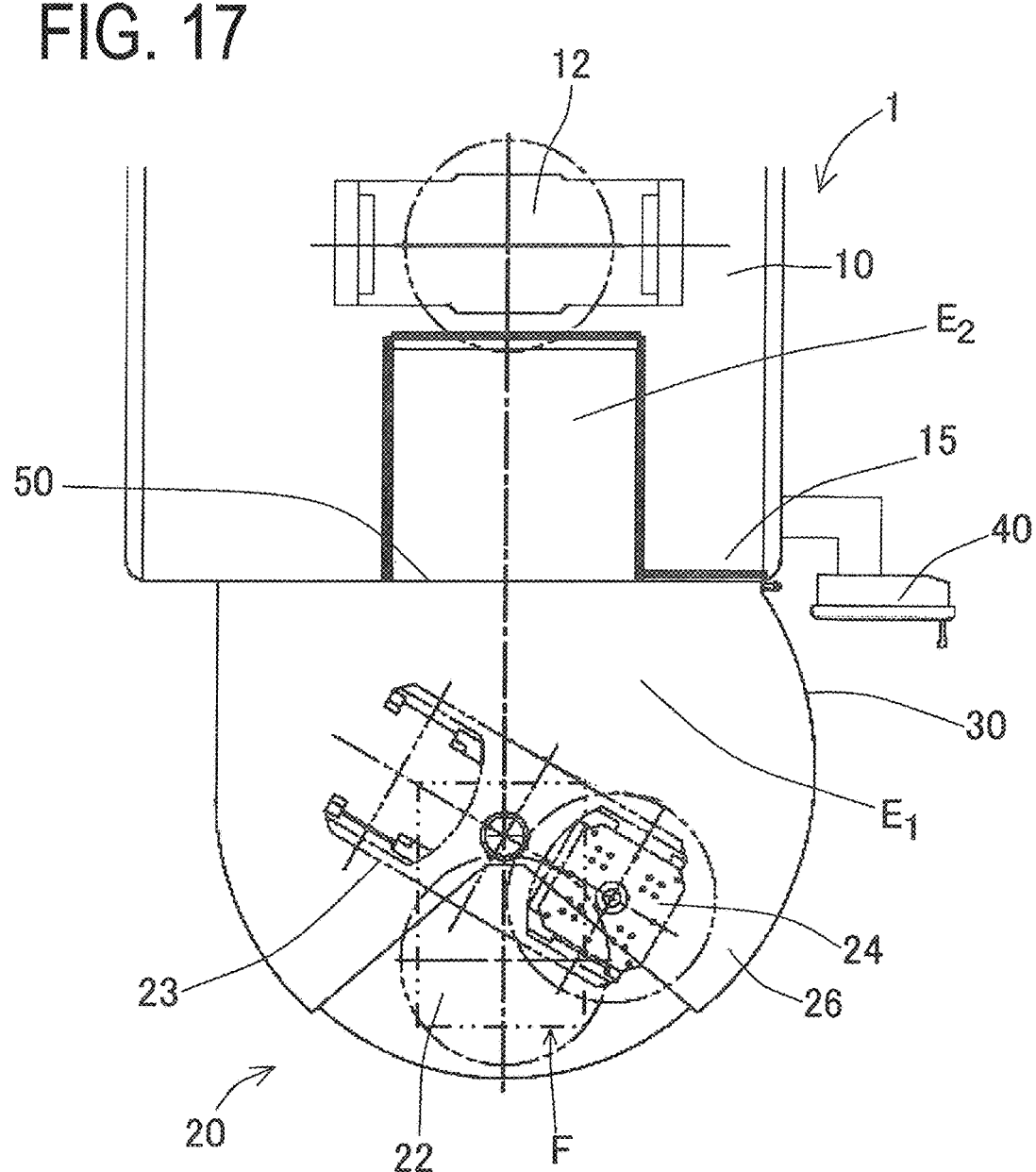
FIG. 17 is a plan view of FIG. 16.

FIG. 15 is a plan view of another embodiment of the present invention. The access door device according to this embodiment is similar to the above-described access door device in that the access door device according to this embodiment includes the machine entry door 110, the first internal machine cover 120, the link member 130, and the second internal machine cover 140.

In the access door device according to the above-described embodiment, the linear guide 150 and the reciprocating-movement control mechanism 155 constitute a guide mechanism for the second internal machine cover 140 to move between the position S1 and the position S2 at approximately the same angle relative to the linear-guide rail 150a. Instead of using the linear guide 150 and the reciprocating-movement control mechanism 155, the access door device according to this embodiment uses cam grooves 200 and cam followers (not illustrated) to be inserted into the cam grooves 200. The cam grooves 200 are disposed on the working floor 70, which is the floor surface of the work area $E_2$ and fixed to the pallet change base 21. The cam followers are disposed on the lower surface 140d of the second internal machine cover 140. While a single cam follower suffices for guiding purposes, providing a plurality of cam followers makes the movement of the second internal machine cover 140 smoother.

The movement of the access door device 100 will be described by referring to FIGS. 1 and 3. In the case where the operator enters the work area $E_2$, the operator presses a machine entry door open switch 163 on the switch panel 60, after the pallet turning arm 23 is turned from an operating position to an evacuating position illustrated in FIG. 3 with the pallet change slider 22 stationary at the setup position F. As a result, the power source to the pallet change unit 20 is shut off, and a door lock switch, not illustrated, between the machine entry door 100 and a cover 15 of the main machine is unlocked.

Then, the operator opens the machine entry door 110, and in conjunction with this, the first internal machine cover 120 and the second internal machine cover 140 move to form a space for the operator in the internal passage area $E_1$ and the work area $E_2$. After the space has been secured, the operator enters the internal passage area $E_1$ of the machine tool 1, opens the operator door 50, and moves into the work area $E_2$.

Then, the operator works on the table 12 or the spindle. Here, the operator swings the operation panel 40 into the internal passage area $E_1$ to control the machine from the internal passage area $E_1$ or the work area $E_2$.

After the work, the operator moves to the internal passage area $E_1$ and closes the operator door 50. Then, the operator closes the machine entry door 110, and in conjunction with closing of the machine entry door 110, the first internal machine cover 120 and the second internal machine cover 140 move. Here, the first internal machine cover 120 and the second internal machine cover 140 sweep the internal passage area $E_1$ and the work area $E_2$. This makes the operator go nowhere but to the position G. As a result, the operator is made go outside the machine tool 1.

When the operator swung the operation panel 40 into the internal passage area $E_1$, the operator must move the operation panel 40 to outside the internal passage area $E_1$; otherwise, the operator is unable to move to the position G. While the operation panel 40 leaves alone in the internal passage area $E_1$, the operator is unable to close the machine entry door 110. Upon closing of the machine entry door 110, a door lock switch, not illustrated, locks the machine entry door 110.

With this device configuration, even if another operator erroneously attempts to close the machine entry door 110 while the former operator stays in the internal passage area $E_1$ or the work area $E_2$ of the machine tool 1, the machine entry door 110 or the internal machine cover 120 interferes with the former operator to prevent the machine entry door 110 from being closed.

The front surface of the front cover 55 and the front surface 50a of the operator door 50 may be disposed in the same plane. In this case, the operator works in the internal passage area $E_1$, making the second internal machine cover 140 unnecessary. This also eliminates the need for the linear guide 150 and the reciprocating-movement control mechanism 155.

In the machine tool according to the embodiment of the present invention, the pallet change unit may include restraining means including one end mounted on the main body cover and another end mounted on the internal machine cover.

In the machine tool according to the embodiment of the present invention, the internal machine cover may include a first internal machine cover and a second internal machine cover abutting the first internal machine cover. The pallet change unit may include a work area communicating with the internal passage area and may be sweepable by the second internal machine cover.

In the machine tool according to the embodiment of the present invention, the pallet change unit may include a linear guide disposed in the work area, which may be coupled to the second internal machine cover through a bracket. The work area may be sweepable by the second internal machine cover on a track on which the second internal machine cover is guided by the linear guide. Here, the bracket and the second internal machine cover may be coupled to each other by a cam mechanism.

In the machine tool according to the embodiment of the present invention, the pallet change unit may include a cam groove on a floor surface of the work area. The second internal machine cover may include a cam follower on a surface of the second internal machine cover facing the floor surface. The cam groove and the cam follower may constitute a cam mechanism, and the work area may be sweepable by the second internal machine cover on a track on which the second internal machine cover is guided by the cam mechanism.

In the machine tool according to the embodiment of the present invention, the first internal machine cover may have a height greater than a height at which a pallet turning arm of the pallet change unit is disposed. The main machine may include a turning mechanism configured to turn about a predetermined turning axis. The turning mechanism may include an operation panel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A machine tool comprising:
   a main machine configured to machine a workpiece;
   a pallet change unit adjacent to the main machine;
   a main body cover covering the pallet change unit;
   a machine entry door provided in the main body cover so as to open and close an opening in the main body cover;
   an internal machine cover connected to the machine entry door and provided within the machine tool; and
   an internal operator entrance area defined by the machine entry door and the internal machine cover and extending within the machine tool so as to accommodate an operator in the internal operator entrance area from the opening to a position proximate to the main machine, the machine entry door and the internal machine cover being constructed to sweep the internal operator entrance area.

2. The machine tool according to claim 1,
   further comprising restraining means comprising one end mounted on the main body cover and another end mounted on the internal machine cover.

3. The machine tool according to claim 2,
   wherein the internal machine cover comprises a first internal machine cover and a second internal machine cover connected to the first internal machine cover,
   wherein the internal operator entrance area comprises a work area adjacent to the main machine, and
   wherein the second internal machine cover is disposed to sweep the work area.

4. The machine tool according to claim 3,
   further comprising a linear guide disposed in the work area and coupled to the second internal machine cover through a bracket, and
   wherein the second internal machine cover sweeps the work area on a path along which the second internal machine cover is guided by the linear guide.

5. The machine tool according to claim 4,
   wherein the bracket and the second internal machine cover are coupled to each other by a cam mechanism.

6. The machine tool according to claim 5,
   wherein the internal operator entrance area comprises a working floor, and
   wherein an upper surface of the first internal machine cover comprises a height relative to the working floor greater than a height, relative to the working floor, at which an upper surface of a pallet turning arm of the pallet change unit is disposed.

7. The machine tool according to claim 4,
   wherein the internal operator entrance area comprises a working floor, and
   wherein an upper surface of the first internal machine cover comprises a height relative to the working floor greater than a height, relative to the working floor, at which an upper surface of a pallet turning arm of the pallet change unit is disposed.

8. The machine tool according to claim 3,
   wherein the pallet change unit comprises a cam groove on a floor surface of the work area,
   wherein the second internal machine cover comprises a cam follower on a surface of the second internal machine cover, and
   wherein the cam groove and the cam follower constitute a cam mechanism, and the second internal machine cover sweeps the work area on a along which the second internal machine cover is guided by the cam mechanism.

9. The machine tool according to claim 8,
   wherein the internal operator entrance area comprises a working floor, and
   wherein an upper surface of the first internal machine cover comprises a height relative to the working floor greater than a height, relative to the working floor, at which an upper surface of a pallet turning arm of the pallet change unit is disposed.

10. The machine tool according to claim 2,
    wherein the main machine comprises an operation panel that is mounted on a turning mechanism configured to turn about a predetermined turning axis.

11. The machine tool according to claim 1,
    wherein the internal machine cover comprises a first internal machine cover and a second internal machine cover connected to the first internal machine cover,
    wherein the internal operator entrance area comprises a work area adjacent to the main machine, and wherein the second internal machine cover is disposed to sweep the work area.

12. The machine tool according to claim 11, further comprising a linear guide disposed in the work area and coupled to the second internal machine cover through a bracket, and
wherein the second internal machine cover sweeps the work area on a path along which the second internal machine cover is guided by the linear guide.

13. The machine tool according to claim 12, wherein the bracket and the second internal machine cover are coupled to each other by a cam mechanism.

14. The machine tool according to claim 13, wherein the internal operator entrance area comprises a working floor, and
wherein an upper surface of the first internal machine cover comprises a height relative to the working floor greater than a height, relative to the working floor, at which an upper surface of a pallet turning arm of the pallet change unit is disposed.

15. The machine tool according to claim 12, wherein the internal operator entrance area comprises a working floor, and
wherein an upper surface of the first internal machine cover comprises a height relative to the working floor greater than a height, relative to the working floor, at which an upper surface of a pallet turning arm of the pallet change unit is disposed.

16. The machine tool according to claim 11, wherein the pallet change unit comprises a cam groove on a floor surface of the work area,
wherein the second internal machine cover comprises a cam follower on a surface of the second internal machine cover, and
wherein the cam groove and the cam follower constitute a cam mechanism, and the second internal machine cover sweeps the work area on a path along which the second internal machine cover is guided by the cam mechanism.

17. The machine tool according to claim 16, wherein the internal operator entrance area comprises a working floor, and
wherein an upper surface of the first internal machine cover comprises a height relative to the working floor greater than a height, relative to the working floor, at which an upper surface of a pallet turning arm of the pallet change unit is disposed.

18. The machine tool according to claim 11, wherein the internal operator entrance area comprises a working floor, and
wherein an upper surface of the first internal machine cover comprises a height relative to the working floor greater than a height, relative to the working floor, at which an upper surface of a pallet turning arm of the pallet change unit is disposed.

19. The machine tool according to claim 11, wherein the main machine comprises an operation panel that is mounted on a turning mechanism configured to turn about a predetermined turning axis.

20. The machine tool according to claim 1, wherein the main machine comprises an operation panel that is mounted on a turning mechanism configured to turn about a predetermined turning axis.

* * * * *